March 16, 1948.  F. F. KISHLINE  2,437,824
METHOD OF ASSEMBLING PISTONS
Original Filed June 19, 1942
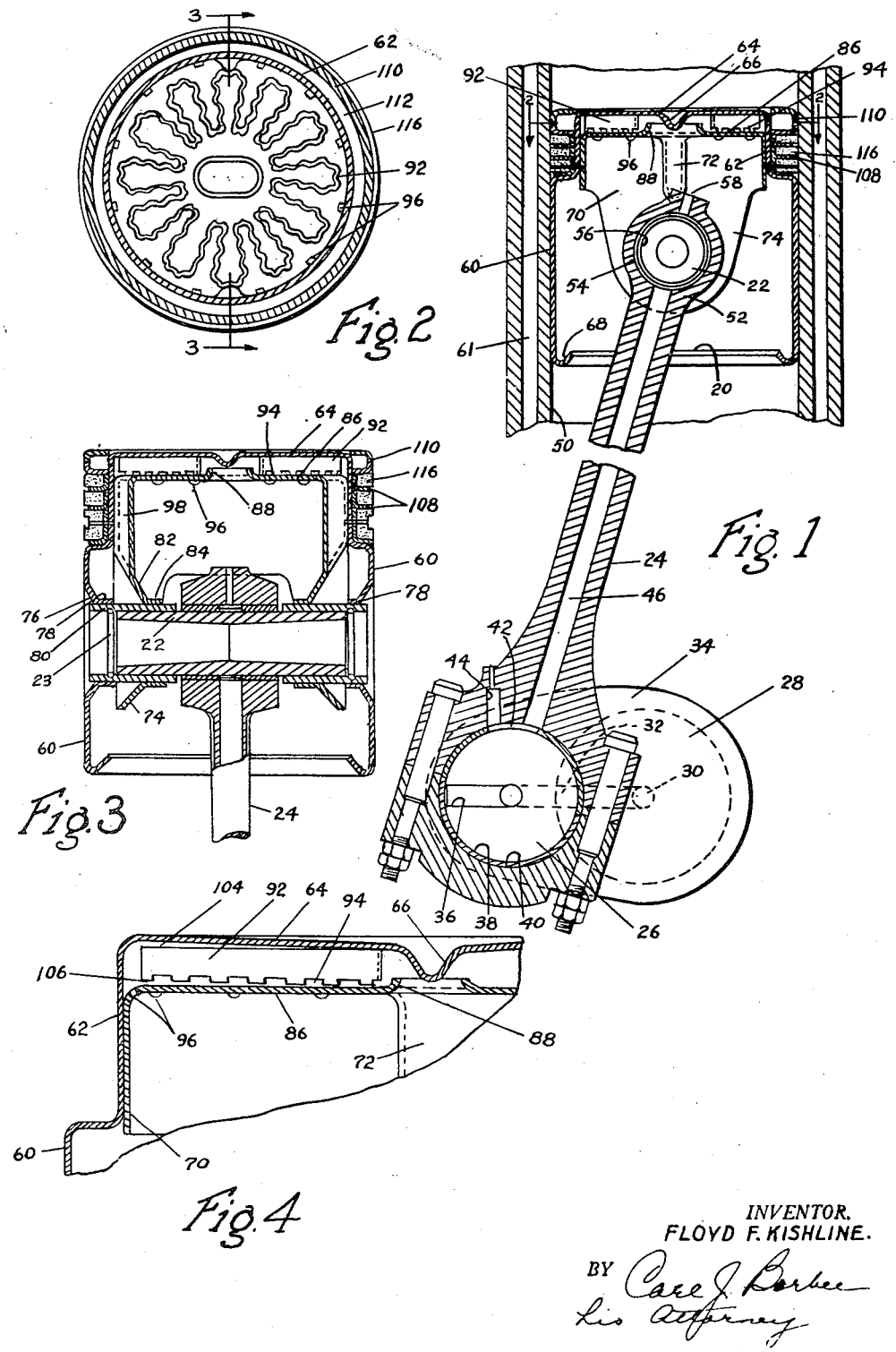
INVENTOR.
FLOYD F. KISHLINE.

Patented Mar. 16, 1948

2,437,824

UNITED STATES PATENT OFFICE 2,437,824

METHOD OF ASSEMBLING PISTONS

Floyd F. Kishline, Kenosha, Wis., assignor to Nash-Kelvinator Corporation, Kenosha, Wis., a corporation of Maryland Original application June 19, 1942, Serial No. 447,636. Divided and this application August 26, 1944, Serial No. 551,357

7 Claims. (Cl. 29—156.5)

This invention relates to a piston and more particularly to a method of assembly of a piston used in an internal combustion engine.

This application is a division of the copending application for a Piston, Serial No. 447,636, filed June 19, 1942, by applicant, Floyd F. Kishline.

As fully discussed in the parent application, Serial No. 447,636, it is quite common in the art to maufacture pistons for internal combustion engines of iron and steel castings although such pistons have certain undesirable qualities. One of the more important problems involved with the use of iron or steel pistons is the transmission of the heat of combustion away from the combustion chamber. Iron and steel pistons, as a general rule, must be provided with a relatively thick head wall to withstand the heat of combustion developed within the combustion chamber without producing hot spots, burn outs and similar problems. Increasing the wall thickness in this region reduces the heat transmitting qualities of the piston head, however.

It is desirable to manufacture pistons of steel or cast iron rather than of other usable metals as they have approximately the same rate of expansion as the cylinder wall with which they are used and thus can be fitted rather closely at relatively low temperatures with the assurance that these fits will be maintained when operating temperature is reached.

The piston as disclosed and claimed in the parent application, Serial No. 447,636, has been designed with a view toward taking advantage of the similarity of coefficients of expansion of the cylinder wall and a cast iron or steel piston and yet make provision for rapid conduction of heat away from the head of the piston. Applicant has done this by providing means for cooling the piston head, which, in this instance, is an extremely thin walled structure reinforced with a box-like section to increase the piston head strength.

The thin wall of the piston is made up of steel stampings and is properly reinforced at its load-bearing points by other light stampings so as to increase the strength without impeding the heat conducting qualities of thin walled sections. Provision is also made for circulation of a cooling fluid over the highly heated portions of the piston to rapidly extract heat therefrom.

It is an object of this invention to provide a method of assembling a piston composed of thin walled steel stampings which is economical and will insure close fits and permanent bonds between the various structures.

It is a further object of this invention to provide a method of assembling a piston composed of thin walled stampings which will not reduce the heat conducting properties of the walls of the piston.

Other objects and advantages of this invention will be recognized as this description proceeds and will be more particularly pointed out in connection with the appended claims.

In the drawings, of which there is one sheet:

Figure 1 is a vertical, transverse, sectional view through a portion of an internal combustion engine showing the cylinder, piston, connecting rod and crank shaft;

Figure 2 is a horizontal sectional view of the piston shown in Figure 1 taken upon a plane as directed by the line 2—2 of Figure 1 and looking in the direction of the arrows;

Figure 3 is a vertical, longitudinal, sectional view of the piston taken upon a plane as indicated by the line 3—3 of Figure 2; and Figure 4 is a detailed sectional view through a portion of the piston head illustrating a step in the method of assembly of the piston.

Referring in more detail to the drawings, in which similar reference characters are employed throughout to designate similar parts, a piston 20 is connected through a piston pin 22 to a connecting rod 24 which is supported upon a crank pin 26 from a crankshaft 28 of an internal combustion engine. Crankshaft 28 is drilled throughout its length as at 30 to receive oil and conduct said oil through drilled passageways 32 in cheek plates 34 to conduct oil to crank pins 26. Pins 26 are drilled radially as at 36 to supply oil to the bearing surface 38.

The bearing insert 40 forming bearing surface 38 is provided with a slot 42 adapted to be aligned once during each rotation of crank pin 26 with oil outlet 36. Bearing insert 40 is maintained against rotation within the end of connecting rod 24 and is aligned with two apertures constituting entrances to oil passageways 44 and 46. Oil passageway 44 is adapted to emit a stream of oil upon the walls 50 of the cylinder as piston 20 approaches its top center position. Passageway 46 extends upwardly centrally of connecting rod 24 to supply oil within wrist pin eye 52 of rod 24.

Wrist pin eye 52 is bushed as at 54, such bushing being provided with a groove 56 therearound. The upper end of connecting rod 24 terminates in a drilled nozzle 58 which is adapted to emit a stream of oil against the underside of the head of piston 20.

The piston 20 shown in Figure 1 is made up of stampings and comprises an outer cylindrical shell 60 having an upper reduced cylindrical portion 62 and concentrically arranged with respect thereto. The head portion of the outer stamping is provided with an integral wall 64 forming a closure for the upper end of the piston 20. Wall 64 is provided with a downwardly drawn depression 66 to receive a tool, as will be more fully explained hereafter. The lower end of skirt 60 is provided with an inwardly and upwardly turned flange 68 which may be conically shaped upon its inside to receive a centering tool.

Portions 66 and 68 are provided to permit the reception of the piston, after completely assembled, within a grinding machine.

Within the outer shell 60 is an inner reinforcing member 70. Inner member 70 may take the form of a shallow cylinder having oppositely disposed ribs 72 upon its front and rear surfaces. Depending from the underside of the shallow cylinder forming the principal part of the inner shell 70 are ears 74 which form, in a sense, extensions of the ribs 72.

Referring to Figure 3, it will be noted that the outer shell 60 is provided with depressions 76 at opposite sides thereof, such depressions 76 terminating in inwardly extruded and flanged portions 78 defining cylinders within which may be received a piston pin bushing 80. Ears 74 are provided with conical depressions 82 similar to depressions 76 and are also extruded and flanged inwardly as at 84 to form orifices aligned with the portions 78 of outer shell 60. The piston pin 22 is positioned within bushings 80 by snap rings 23.

The upper end of the inner shell is closed by an end wall 86, such wall being provided with an elliptical opening 88. Opening 88 has its long axis extending transversely of the piston, as shown in Figure 2, or in the same plane as that of the rotation of crank pin 26 so as to permit a relatively long sweep of the oil nozzle 58 during the period opening 88 receives oil therefrom. Opening 88 is also centered upon the depression 66 so as to have 66 serve to distribute radially the oil received through opening 88.

The end closure 86 of the inner shell is spaced from the end closure 64 of the outer shell by means of a sinuous corrugated steel ribbon 92. Ribbon 92 is thin with respect to its width and the corrugations, as shown in Figure 2, are employed for the purpose of stabilizing it so that it may be stood on its edge as shown in Figures 1 through 4. The ribbon 92 is fashioned into a rosette form as shown in Figure 2. A series of notches 94 are provided in the lower edge of ribbon 92, permitting oil trapped therein to flow to the outside of the rosette to cool the inside and outside of the corrugations formed by the ribbon and against the underside of the entire surface of the piston head 64.

Oil which has been sprayed from nozzle 58, has struck the bottom of depression 66 and been deflected outwardly therefrom onto the upper surface of end closure 86, will flow along the surface thereof through notches 94 to the outside and downwardly toward the crankcase through apertures 96 in the outer periphery of the inner shell of closure 86. A portion of the oil so circulated will return along the inner wall of the outer shell by means of grooves 98 formed by the ribs 72.

Attention is directed to Figure 4 which shows the method of assembly of the outer shell, inner shell 70 and the rosette formed by the ribbon 92, to which subject the appending claims are directed.

The various parts are shown in Figure 4 as loosely assembled prior to the operation in which they are pressed into contact with one another. It will be understood that the outer surface of the cylindrical portion 70 of the inner shell has a pressed fit with the inner surface of the reduced cylindrical portion 62 of the outer shell as shown in Figure 4. The outer shell 60 is inverted, the rosette dropped into place upon the inside surface of the head closure 64 with the notches 94 upwardly disposed in this position and the inner shell 70 is then placed within the reduced cylindrical portion 62 of the outer shell and forced down into position. The head and end wall 64 of the outer shell 60 is shown slightly dished in Figure 4 while the end closure 86 of the inner shell is shown slightly deformed upwardly. The rosette 92 is of uniform vertical extent throughout and consequently that portion of the rosette toward the center of the piston will be the first to seat upon both the under surface of the head 64 and upon the upper surface of the closure 86 as the inner shell 70 is pressed into place.

Attention is directed to the clearance 104 existing between the upper surface of the rosette 92 and the under surface of the head 64 as well as to the clearance 106 which exists between the bottom surface of the rosette 92 and the upper surface of the inner shell head closure 86. As the assembly continues, the upwardly deformed end closure 86 will be returned to a single plane and the dishing which is apparent in Figure 4 in the head 64 will be flattened out so that each of these parts is returned to a single plane and each part is seated throughout its extent upon adjacent portions of the rosette 92. This seriatim seating of the rosette edge portions upon both the inner and outer head forming elements insures solid contact throughout the entire extent of the edge portions of the rosette with both of these elements and makes it possible to later perform a hydrogen welding operation upon the piston. Solid contact of the rosette with both parts and subsequent hydrogen welding provide for efficient heat transfer from head 64 through or past rosette 92 and to closure head 86.

The reduced portion 62 of the outer shell 60 is provided for the purpose of forming a seat for a plurality of flanged rings 108 which are pressed downwardly over the outside of portion 62, abutting one another with their flanges outwardly extending and spaced from one another. A U-shaped ring 110 is secured around portion 62 above rings 108 to hold said rings in place. The grooves which are formed between the flanges of rings 108 are adapted to receive piston rings 116 such as are usually provided upon the piston of internal combustion engines.

Before piston rings 116 are assembled upon the piston, it is necessary to secure all of the other elements making up the piston to one another in a permanent bond and this is accomplished by hydrogen welding, which comprises heating the piston in the presence of a copper brazing material in a hydrogen atmosphere. This operation causes the flow of the copper brazing material into all of the joints and results in a unity of the parts through these joints by means of the copper. Pressure means are used to hold the parts of the assembled piston in solid contact with each other and sufficient additional pressure is applied to return the dished elements 64 and 86 to their normal condition. This operation will create strains in the assembly because of the above mentioned change in shape of the metal elements 64 and 86. These strains will be relieved by the annealing of the metal when heated during the brazing operation. After the brazing operation, the piston is allowed to cool and is chucked upon tools between the conical surfaces 66 and 68 and finish ground to the desired final form. After final grinding, the rings 108, 110 and 116 are assembled on the piston 20 and said piston is complete.

While the invention has been described in considerable detail, the foregoing description is not to be taken as limiting but simply as illustrating the invention and all equivalents falling within the scope of the appended claims are hereby expressly reserved.

I claim:

1. A method of assembling pistons for an internal combustion engine which comprises providing a stamped outer member having a head forming element, providing a stamped inner member having an inner head reinforcing element, deforming the head forming element of said outer member downwardly, deforming the head reinforcing element of said inner member upwardly, placing a rosette of ribbon metal within said outer member and against the underside of the head forming element, placing said inner member within said outer member, pressing said inner and outer members and the interposed rosette together with sufficient force to return to normal the deformed portions of said head forming and reinforcing elements, and, while the parts are so held, subjecting the so-assembled piston to a hydrogen brazing operation.

2. A method of hydrogen brazing stamped parts together which comprises providing an outer shell having a closed end, dishing said closed end downwardly into said shell, providing an inner shell having an end closure, deforming said end closure upwardly, placing said inner shell within said outer shell, pressing said inner and outer shells together and simultaneously causing said dished and deformed portions to be returned toward their normal condition, and thus subjecting the so-assembled parts to a hydrogen brazing operation.

3. A method of hydrogen brazing comprising providing a female part having an inwardly deformed portion, providing a male part having an outwardly deformed portion, pressing said male part into said female part to return said inwardly and outwardly deformed portions to flat condition but under an initial strain serving tightly to hold said portions in contact with one another, and then, while said parts are so pressed together, subjecting the assembly to a hydrogen brazing operation to weld said parts together and to remove strain by the annealing of the brazing temperature.

4. A method of assembling a piston for an internal combustion engine comprising an outer cylindrical stamping having an inwardly dished head portion closing one end of said outer stamping and an inner cylindrical member having an outwardly dished second head portion closing the innermost end of said inner member and a rosette of ribbon steel interposed between the top of the second head portion and the bottom of said first head portion and spacing said head portions, sufficient force to tightly press said first and second head portions into engagement with the edges of said rosette adjacent thereto, and application of a hydrogen brazing operation to said assembly while said parts are pressed together for securing the parts together.

5. A method of assembling a piston for an internal combustion engine comprising an outer cylindrical member having an inwardly dished head portion closing one end of said outer member and a rosette of ribbon steel placed within said member against the inner side of said head portion and an inner cylindrical member having an outwardly dished second head portion closing one end of said inner cylindrical member and reinforcing means within said inner cylindrical member and having the second cylindrical member placed within said first cylindrical member with the outer side of the second head portion abutting the rosette on its side opposite from the first head portion, application of sufficient force to press fit and hold this assembly together, with the inner side of the first head portion abutting the entire edge of said rosette adjacent thereto and the outer side of said second head portion abutting that portion of the other edge of said rosette adjacent thereto and application of a hydrogen brazing operation to permanently bond the parts of this piston as assembled.

6. A method of assembling a piston for an internal combustion engine comprising an outer cylindrical member having a relatively thin head portion closing one end of said cylindrical member with said head portion being slightly dished inwardly, a rosette of ribbon steel placed inside the outer cylindrical member, an inner cylindrical member having a relatively thin second head portion closing one end of said inner member and being slightly dished outwardly in relation to the inner cylindrical member and reinforcing means inside the inner cylindrical member, the inner cylindrical member being placed inside the outer cylindrical member with the second head portion abutting the rosette, application of sufficient compressive force on the outer and inner cylindrical members to distort the dished head portions to a condition in which those portions of their surfaces adjacent said rosette conform to the general contour defined by the edges thereof, and while the assembled parts are so held in conformity, an application of hydrogen brazing to permanently bond said parts together.

7. A method of assembling a piston for an internal combustion engine comprising forming an assembly having an outer cylindrical member having a closed end portion slightly dished inwardly, a rosette of ribbon steel placed within said cylindrical member, an inner cylindrical member having an outwardly dished closed end portion and inserted into the outer member with the closed end foremost to abutment with the rosette, compressive force fitting said parts closely together deforming said dished end portions to a flat condition, and bonding together of the assembled parts by hydrogen brazing as they are held tightly together.

FLOYD F. KISHLINE.

REFERENCES CITED

The following references are of record in the file of this patent:

UNITED STATES PATENTS

| Number | Name | Date |
| --- | --- | --- |
| 505,318 | Lisk | Sept. 19, 1893 |
| 1,879,082 | Carvalho | Sept. 27, 1932 |
| 2,039,398 | Dye | May 5, 1936 |
| 2,062,841 | Stefancky | Dec. 1, 1936 |
| 2,174,644 | Weatherhead | Oct. 3, 1939 |
| 2,305,654 | Wilkinson | Dec. 22, 1942 |
| 2,308,875 | Goepfrich | Jan. 19, 1943 |
| 2,341,836 | Wood | Feb. 15, 1944 |

FOREIGN PATENTS

| Number | Country | Date |
| --- | --- | --- |
| 491,843 | Great Britain | Sept. 6, 1938 |